United States Patent
Sugimoto

(10) Patent No.: US 6,270,716 B1
(45) Date of Patent: Aug. 7, 2001

(54) PROCESS FOR THE PRODUCTION OF LOW-TEMPERATURE FIRING CERAMIC COMPOSITIONS

(75) Inventor: Yasutaka Sugimoto, Kyoto (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/451,736

(22) Filed: Nov. 30, 1999

(30) Foreign Application Priority Data

Mar. 1, 1999 (JP) .................................................. 11-052878

(51) Int. Cl.$^7$ ..................................................... C04B 33/32
(52) U.S. Cl. ........................... 264/614; 264/619; 264/642
(58) Field of Search .................................... 264/614, 619, 264/642

(56) References Cited

FOREIGN PATENT DOCUMENTS

403295854 * 12/1991 (JP) .
4100007462 * 1/1998 (JP) .

\* cited by examiner

*Primary Examiner*—Christopher A. Fiorilla
(74) *Attorney, Agent, or Firm*—Ostrolenk, Faber, Gerb & Soffen, LLP

(57) ABSTRACT

A process for the production of dielectric porcelain composition includes: a first step of admixing $Bi_2O_3$ and CuO with a $BaO$—$TiO_2$—$ReO_{3/2}$ main material, wherein Re is a lanthanoid element, to give a material mixture; a second step of calcining the material mixture at a temperature of 950° C. or higher; a third step of milling the calcined material mixture to a mean particle diameter of about 2.0 μm or less; a fourth step of admixing a $B_2O_3$—$SiO_2$ glass component and CuO with the milled material mixture to give a material for a dielectric porcelain composition; and a fifth step of forming the material into a target shape and firing the shaped material at a temperature of 1000° C. or lower. The obtained dielectric porcelain composition is sinterable at low temperatures and has a high specific dielectric constant and Q-value and a satisfactory thermostability.

17 Claims, 1 Drawing Sheet

PROCESS FOR THE PRODUCTION OF LOW-TEMPERATURE FIRING CERAMIC COMPOSITIONS

BACKGROUND OF THE INVENTION

1. Field of the Invention

The present invention relates to a process for the production of low-temperature firing ceramic compositions which are used as, for example, dielectric ceramics for microwave resonators, high-frequency filters and monolithic capacitors, and ceramics for multilayered substrates.

2. Description of the Related Art

To miniaturize electronic parts such as microwave resonators and high-frequency filters, efforts have been made to replace cavity resonators with dielectric ceramics each having a high dielectric constant. Such a dielectric resonator utilizes the effect that the wavelength of an electromagnetic wave is shortened inside a dielectric to $1/\epsilon^{1/2}$ the wavelength in free space, wherein $\epsilon$ is the dielectric constant of the dielectric.

However, a dielectric ceramic having such a temperature coefficient such as to be applicable as a dielectric resonator can only have a specific dielectric constant $\epsilon r$ of at most 100, which is insufficient to meet the requirements of further miniaturization of resonators in recent years.

An effective solution to this requirement under the limitation of low specific dielectric constant $\epsilon r$ of dielectric ceramics is to use LC resonators which are employed in microwave circuits. In addition, the application of a lamination forming process, which has practically been applied to monolithic capacitors and multilayer substrates, to the construction of LC resonant circuits can give further miniaturized electronic parts having high reliability.

To obtain LC resonators each having a high Q-value in a microwave band by the lamination forming process, the internal electrodes to be integrated in monolithic capacitors or multilayer substrates must have a high electrical conductivity. In other words, such internal electrodes must be composed of gold, silver, copper or another metallic material having a high electrical conductivity, which internal electrodes are cofired with dielectric ceramics or ceramics for multilayer substrates.

Thus, the dielectric materials need to be high in dielectric constant, Q-value and theimostability and to be low-temperature firing ceramic compositions which can be cofired with internal electrodes composed of a metallic material having a low melting point. Few dielectric materials, however, provide these requirements in good balance.

As a possible solution to this problem, for example, Japanese Unexamined Patent Publication No. 6-40767 discloses a technique including the steps of: (1) calcining a porcelain composition mainly containing a BaO—TiO$_2$—ReO$_{3/2}$, wherein Re is a rare earth element, at a temperature of 1050° C. or higher, milling the calcined composition to a mean particle diameter of 0.8 μm or less, and adding a glass powder mainly containing B$_2$O$_3$ to give a material powder; or (2) adding a glass powder predominantly comprising B$_2$O$_3$ to a porcelain composition containing a BaO—TiO$_2$—ReO$_{3/2}$ as a main component, calcining the resultant mixture at a temperature of 1050° C. or higher, and milling the calcined mixture to a mean particle diameter of 0.8 μm or less to give a material powder; and forming and firing the material powder to give a low-temperature firing ceramic composition.

According to this technique, a dielectric porcelain composition which can be sintered at a temperature equal to or lower than the melting point of silver and has a comparatively high specific dielectric constant, a high Q-value and a low temperature coefficient of a resonant frequency is realized. However, the technique, in which a main crystalline phase (e.g., Ba(Nd,Bi)$_2$Ti$_4$O$_{12}$) is not precipitated in the calcination at a low temperature of about 1000° C., requires the calcination at a high temperature of 1050° C. or higher (preferably 1100° C. to 1300° C.), and the calcination at such a high temperature entails high costs.

SUMMARY OF THE INVENTION

According to the present invention, a process for the production of low-temperature firing ceramic compositions is provided, which process can yield, with facility, low-temperature firing ceramic compositions which are sinterable at low temperatures, have a high specific dielectric constant and Q-value and satisfactory thermostability.

To be more specific, the invention provides a process for the production of low-temperature firing ceramic compositions, the process including:

a first step of admixing CuO with a BaO—TiO$_2$—ReO$_{3/2}$—Bi$_2$O$_3$ main material, wherein Re is a lanthanoid element, to give a ceramic material mixture; a second step of calcining the ceramic material mixture; a third step of milling the calcined ceramic material mixture; a fourth step of admixing a B$_2$O$_3$—SiO$_2$ glass component with the milled ceramic material mixture to give a glass-ceramic material mixture; and a fifth step of forming the glass-ceramic material mixture into a target (desired) shape and firing the formed glass-ceramic material mixture.

In the first step of the inventive process, the CuO is added in a proportion of about 0.1% to 2.0% by weight relative to 100% by weight of the main material.

The calcination in the second step is preferably be conducted at a temperature equal to or higher than 950° C.

In the third step, the calcined ceramic material mixture is preferably milled to a mean particle diameter of about 2.0 μm or less.

In the fourth step, another portion of CuO is preferably further admixed with the milled ceramic material mixture.

In the inventive process, about 80.0% to 98.0% by weight of the milled ceramic material mixture, about 1.0% to 20.0% by weight of an RO—B$_2$O$_3$—SiO$_2$ glass material as the glass component, wherein R is an alkaline earth metal element, and about 2.0% by weight or less of CuO may be admixed in the fourth step to make the glass-ceramic material mixture (100% by weight).

According to the inventive process for the production of low-temperature firing ceramic compositions, where CuO is admixed before calcination, a main crystalline phase of, for example, Ba(Nd,Bi)$_2$Ti$_4$O$_{12}$ is precipitated even at low calcination temperatures, and therefore a dielectric porcelain composition which can be sintered at low temperatures and has a high specific dielectric constant and a high Q-value and a satisfactory thermostability can be produced with facility.

This is because when CuO is added to a main material predominantly containing, for example, BaCO$_3$, TiO$_2$, ReO$_{3/2}$ and Bi$_2$O$_3$ and the resultant mixture is calcined, CuO forms a liquid phase and promotes the reaction of the main material and thereby promotes the formation of a main crystalline phase of, for instance, Ba(Nd,Bi)$_2$Ti$_4$O$_{12}$. In addition, CuO anchors to the surface of the main crystalline phase particle after the calcination to thereby increase the sinterability of the main crystalline phase particle. In addition, the milling of the main crystalline phase particle increases its specific surface area to further improve the sinterability.

In particular, the addition of sintering aids including B$_2$O$_3$—SiO$_2$ or another glass component, and CuO to the milled material mixture can reduce the firing temperature to 1000° C. or below, and the resultant composition can be sintered at a temperature lower than the melting point of a conductive substance mainly containing, for example, silver, gold or copper having a low specific resistance. The increased sinterability of the main crystalline phase can minimize the proportion of the sintering aid to give low-temperature firing ceramic compositions having a high specific dielectric constant and a low dielectric loss.

Such low-temperature firing ceramic compositions can be cofired with internal electrodes composed of, for instance, gold, silver or copper having a low specific resistance, and can provide ceramic parts or multilayer ceramic substrates internally having these internal electrodes and having satisfactory high-frequency characteristics. Furthermore, the use of these dielectric porcelain compositions can give by the lamination forming process further miniaturized LC resonators, LC filters, monolithic capacitors and other electronic parts each having a high Q-value and higher functions.

DESCRIPTION OF THE PREFERRED EMBODIMENT

Figure 1:
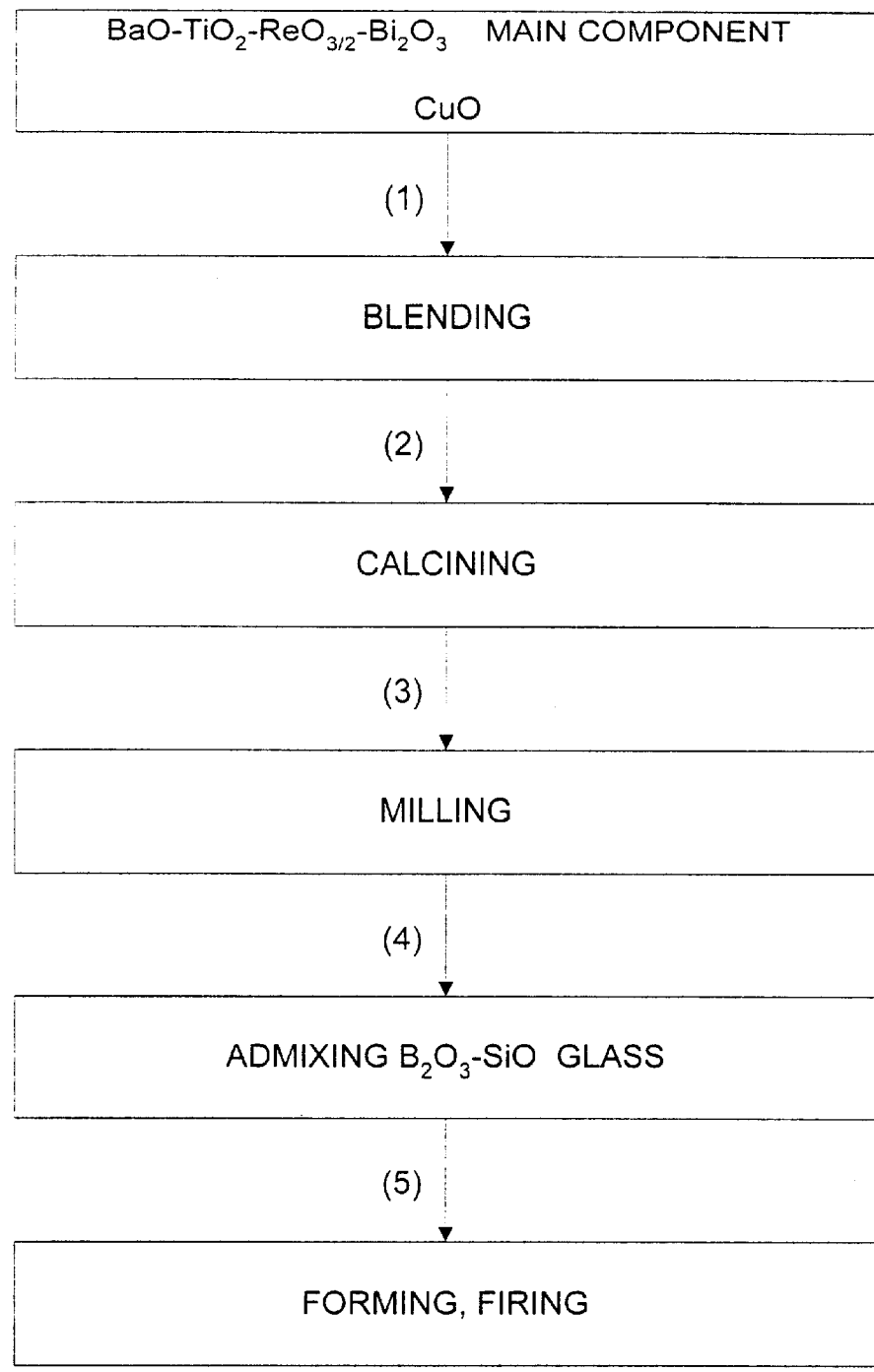
FIG. 1 is a flowchart illustrating a process for the production of dielectric porcelain compositions according to an embodiment of the present invention.

The invention will be described further with reference to an embodiment of the invention.

As shown in FIG. 1, a low-temperature firing ceramic composition is prepared in the following manner: In the first step (1), material powders, for example, $BaCO_3$, $TiO_2$ and $NdO_{3/2}$ powders, are weighed and mixed in such a manner that the mole ratios of BaO, $TiO_2$ and $NdO_3$ are in predetermined ratios, and $Bi_2O_3$ powder is then added to the mixture in a given proportion to give a powdery main material. Subsequently, CuO powder is admixed with the powdery main material in a given compositional ratio to give a powdery ceramic material mixture.

In the first step, the CuO powder is preferably added in a proportion of about 0.1% to 2.0% by weight relative to 100% by weight of the powdery main material. If the proportion of the CuO powder in this step exceeds about 2.0% by weight, the Q-value of the resultant low-temperature firing ceramic composition may sometimes be decreased. On the contrary, if it is less than about 0.1% by weight, the low-temperature firing effect is liable to be deteriorated.

Next, the powdery ceramic material mixture is calcined at a given calcination temperature for a given period of time in the second step (2). The calcination temperature in the second step is preferably 950° C. or higher. If it is lower than 950° C., a main crystalline phase of, for example, $Ba(Nd,Bi)_2Ti_4O_{12}$ may not be formed. The calcination temperature is preferably 1050° C. or lower in the consideration of costs for the calcination, because the main crystalline phase is precipitated sufficiently even if it is 1050° C. or lower. When the calcination temperature exceeds 1050° C., the milling of the powdery ceramic material mixture is liable to become difficult.

In the third step (3), the calcined powdery ceramic material mixture is milled with, for example, a ballmill to a given mean particle diameter. The calcined powdery ceramic material mixture is preferably milled to a mean particle size of about 2.0 μm or less. If the mean particle diameter of the calcined powdery ceramic material mixture exceeds about 2.0 μm, the sinterability of the main crystalline phase itself is liable to be deteriorated thereby to make low-temperature firing difficult. The calcined powdery ceramic material mixture is preferably milled to a mean particle size of about 0.1 μm or more because such powder exhibits less aggregation and can be formed into sheets with facility.

Subsequently, in the fourth step (4), a $B_2O_3$—$SiO_2$ glass component which also serves as a sintering aid is blended with the milled powdery ceramic material mixture to give a powdery glass-ceramic material mixture. The $B_2O_3$—$SiO_2$ glass component may be obtained in the following manner: BaO, SrO, CaO, MgO, $Li_2O$ and other secondary components are added to main components, $B_2O_3$ and $SiO_2$, and the resultant mixture is blended sufficiently, made molten at a temperature of 1100° C. to 1400° C., is put into water for quenching, and is subjected to wet grinding in, for example, ethanol.

In this step, CuO is preferably added as the sintering aid in addition to the $B_2O_3$—$SiO_2$ glass component. This CuO (hereinafter may be referred to as "additional CuO") itself serves as a sintering aid and serves to lower the softening point of the glass component.

It is preferable that about 80.0% to 98.0% by weight of the milled powdery ceramic material mixture, about 1.0% to 20.0% by weight of an RO—$B_2O_3$—$SiO_2$ glass component, wherein R is Mg, Ca, Sr, Ba or another alkaline earth metal element, and equal to or less than about 2.0% by weight of the additional CuO be combined to make the low-temperature firing powdery ceramic material mixture (100% by weight).

To be more specific, if the proportion of the milled powdery ceramic material mixture is less than about 80.0% by weight, a satisfactory specific dielectric constant εr and Q-value may not be obtained. On the contrary, if it exceeds about 98.0% by weight, sintering at low temperatures of 1000° C. or lower may become hard. If the proportion of the glass component is less than about 1.0% by weight, the firing at low temperatures may become hard. On the contrary, if it exceeds about 20% by weight, the specific dielectric constant εr and Q-value may be decreased. The use of the additional CuO in a proportion exceeding about 2.0% by weight may reduce the Q-value of the resultant low-temperature firing ceramic composition.

In the fifth step (5), adequate amounts of, for instance, an organic binder, a plasticizer and an organic solvent are added to the powdery glass-ceramic material mixture, and the mixture is sufficiently kneaded to give a slurry for the formation of ceramic green sheets. The obtained slurry is formed into a sheet having a given thickness by, for example, a doctor blade process, and then a predetermined via hole or conductor pattern is formed thereon. The formed ceramic green sheet is then cut to a given size, and a plurality of plies are pressure-bonded. The bonded product is then fired, for example, at a temperature of 900° C. in air for 1 hour to give a dielectric ceramic for a variety of ceramic electronic parts or a multilayer ceramic substrate for high-frequency composite parts.

According to the aforementioned process, a low-temperature firing ceramic composition can be obtained, where a main crystalline phase is precipitated at a comparatively low calcination temperature of about 950° C. to 1050° C. and thus costs for the calcination can be reduced, which composition is sinterable at a temperature equal to or lower than the melting points of silver and the like and has a comparatively high specific dielectric constant, a high Q-value and a low temperature coefficient of the resonant frequency.

In accordance with the inventive process for the production of low-temperature firing ceramic compositions, dielectric ceramics and multilayer ceramic substrates can be obtained by forming a desired conductor pattern or via hole in a ceramic green sheet, laminating and pressure-bonding the sheet and subjecting the bonded product to firing or other processing. Such dielectric ceramics can be used, for example, for microwave resonators, high-frequency filters and monolithic capacitors, and such multilayer ceramic substrates can be applied to high-frequency composite parts such as voltage controlled oscillators.

The invention will be further illustrated in detail with reference to examples below which are not directed to limiting the scope of the invention.

EXAMPLES

In these examples, ceramic compositions were produced as follows. First, a series of powdery ceramic material mixtures (ceramic components) were prepared by adding CuO to a $BaO$—$TiO_2$—$ReO_{3/2}$—$Bi_2O_3$ main material in the following manner.

Initially, $BaCO_3$, $TiO_2$ and $NdO_{3/2}$ were weighed and admixed to give mixtures. Next, $Bi_2O_3$ powder was added to each of the mixtures to give a series of powdery main materials, and CuO powder was blended with the powdery main materials to give a series of powdery ceramic material mixtures. The powders were then calcined at temperatures ranging from 900° C. to 1200° C. for 2 hours, and were milled with a ball mill to give powdery ceramic material mixtures indicated as the porcelains S1 to S20 in Table 1. Parameters including the compositional ratios (% by mole) and proportions (% by weight) of the materials, and the mean particle diameters (D50) of the milled powders are indicated in Table 1 below.

TABLE 1

| Porcelain No. | Main material | | | | | CuO (wt %) | Calcining temperature (° C.) | Mean particle diameter |
|---|---|---|---|---|---|---|---|---|
| | BaO (mol %) | $TiO_2$ (mol %) | $ReO_{3/2}$ (mol %) | Re | $Bi_2O_3$ (wt %) | | | |
| S1  | 13.0 | 61.0 | 26.0 | Nd | 10.0 | 3.0  | 1025 | 1.0 |
| S2  | 13.0 | 61.0 | 26.0 | Nd | 10.0 | 2.0  | 1025 | 1.0 |
| S3  | 13.0 | 61.0 | 26.0 | Nd | 10.0 | 0.5  | 1025 | 1.0 |
| S4  | 13.0 | 61.0 | 26.0 | Nd | 10.0 | 0.1  | 1025 | 1.0 |
| S5  | 13.0 | 61.0 | 26.0 | Nd | 10.0 | 0.05 | 1025 | 1.0 |
| S6  | 13.0 | 61.0 | 26.0 | Nd | 10.0 | 0    | 1025 | 1.0 |
| S7  | 13.0 | 61.0 | 26.0 | Nd | 10.0 | 0.5  | 900  | 1.0 |
| S8  | 13.0 | 61.0 | 26.0 | Nd | 10.0 | 0.5  | 950  | 1.0 |
| S9  | 13.0 | 61.0 | 26.0 | Nd | 10.0 | 0.5  | 1000 | 1.0 |
| S10 | 13.0 | 61.0 | 26.0 | Nd | 10.0 | 0.5  | 1100 | 1.0 |
| S11 | 13.0 | 61.0 | 26.0 | Nd | 10.0 | 0.5  | 1200 | 1.0 |
| S12 | 13.0 | 61.0 | 26.0 | Nd | 10.0 | 0.5  | 1025 | 0.6 |
| S13 | 13.0 | 61.0 | 26.0 | Nd | 10.0 | 0.5  | 1025 | 2.0 |
| S14 | 13.0 | 61.0 | 26.0 | Nd | 10.0 | 0.5  | 1025 | 3.0 |
| S15 | 13.0 | 61.0 | 26.0 | Nd | 3.0  | 0.5  | 1025 | 1.0 |
| S16 | 13.0 | 61.0 | 26.0 | Nd | 3.0  | 0.05 | 1025 | 1.0 |
| S17 | 13.0 | 61.0 | 26.0 | Pr | 10.0 | 0.5  | 1025 | 1.0 |
| S18 | 13.0 | 61.0 | 26.0 | Pr | 10.0 | 0.5  | 900  | 1.0 |
| S19 | 13.0 | 61.0 | 26.0 | Sm | 10.0 | 0.5  | 1025 | 1.0 |
| S20 | 13.0 | 61.0 | 26.0 | Sm | 10.0 | 0.5  | 1025 | 3.0 |

The proportion of $B_2O_3$ is based on the balance of the main material, and the CuO proportion is based on the entire main material.

Next, a series of glass powders were prepared by adding BaO, SrO, CaO, MgO and $Li_2O$ to main components, $B_2O_3$ and $SiO_2$, in the compositional ratios (% by weight) indicated in Table 2. The glass powders were melted at temperatures ranging from 1100° C. to 1400° C., put into water for quenching, and were subjected to wet grinding in ethanol to give a series of glass powders (glass components) G1 to G3 indicated in Table 2.

TABLE 2

| Glass No. | Glass Component | | | | | | | |
|---|---|---|---|---|---|---|---|---|
| | Main component (wt %) | | $Li_2O$ (wt %) | Alkaline earth metal oxide | | | | |
| | | | | Total amount (wt %) | Content (wt %) | | | |
| | $B_2O_3$ | $SiO_2$ | | | BaO | SrO | CaO | MgO |
| G1 | 14.0 | 23.0 | 2.0 | 61.0 | 82.0 | 11.0 | 5.0 | 2.0 |
| G2 | 14.0 | 23.0 | 2.0 | 61.0 | 100  | 0    | 0   | 0   |
| G3 | 15.0 | 24.0 | 0   | 61.0 | 82.0 | 11.0 | 5.0 | 2.0 |

A glass powder G1 to G3 was added to a powdery ceramic material mixtures S1 to S20 in the compositional ratios defined in Table 3 to give material mixture powders. CuO powder (additional CuO) was then added to each of the material mixture powders in the proportions shown in Table 3 to give a series of powdery glass-ceramic material mixtures. Adequate amounts of an organic binder, a plasticizer, an organic solvent and the like were added to each of the powdery glass-ceramic material mixtures, and the resultant mixtures were kneaded to give slurries for ceramic green sheets.

Each of the slurries for ceramic green sheets was formed into a sheet 50 μm thick by the doctor blade process, and the formed ceramic green sheet was cut to pieces 30 mm long and 10 mm wide. The pieces were laminated to a thickness of 0.5 mm and the resultant laminate was pressure-bonded. The bonded laminate was fired at 900° C. in air for 1 hour to give plate shaped low-temperature firing ceramic compositions indicated as the samples No. 1 to No. 29 in Table 3.

The obtained samples No. 1 to No. 29 were subjected to measurements of the specific dielectric constant $\epsilon$, the Q-value, the rate of change of electrostatic capacity with temperature (temperature coefficient of dielectric constant) Tcc (ppm/C). The specific dielectric constant r was determined at a frequency of 1 MHZ. The measured characteristics are also shown in Table 3.

TABLE 3

| Sample number | Ceramic component | | Glass component | | Amount of additional CuO | Firing temperature | $\epsilon r$ | Q-value | Tcc | Remarks |
|---|---|---|---|---|---|---|---|---|---|---|
| | Porcelain number | Proportion | Glass number | Proportion | | | | | | |
| 1 | S1 | 95.0 | G1 | 4.2 | 0.8 | 900 | 101 | 800  | +130 | low Q-value |
| 2 | S2 | 95.0 | G1 | 4.2 | 0.8 | 900 | 97  | 1800 | +30  | |
| 3 | S3 | 95.0 | G1 | 4.2 | 0.8 | 900 | 90  | 3800 | −20  | |

TABLE 3-continued

| | Ceramic component | | Glass component | | | | | | | |
|---|---|---|---|---|---|---|---|---|---|---|
| Sample number | Porcelain number | Proportion | Glass number | Proportion | Amount of additional CuO | Firing temperature | εr | Q-value | Tcc | Remarks |
| 4  | S4  | 95.0 | G1 | 4.2  | 0.8 | 900 | 85  | 3500 | −25  | |
| 5  | S5  | 95.0 | G1 | 4.2  | 0.8 | 900 | —   | —    | —    | insufficient sinterability |
| 6  | S6  | 89.2 | G1 | 10.0 | 0.8 | 900 | 74  | 3000 | −5   | |
| 7  | S7  | 95.0 | G1 | 4.2  | 0.8 | 900 | —   | —    | —    | insufficient sinterability |
| 8  | S8  | 95.0 | G1 | 4.2  | 0.8 | 900 | 80  | 2800 | +10  | |
| 9  | S9  | 95.0 | G1 | 4.2  | 0.8 | 900 | 85  | 3200 | −5   | |
| 10 | S10 | 95.0 | G1 | 4.2  | 0.8 | 900 | 91  | 3800 | −25  | |
| 11 | S11 | 95.0 | G1 | 4.2  | 0.8 | 900 | 92  | 3800 | −30  | |
| 12 | S12 | 95.0 | G1 | 4.2  | 0.8 | 900 | 92  | 3900 | −30  | |
| 13 | S13 | 95.0 | G1 | 4.2  | 0.8 | 900 | 80  | 2500 | +15  | |
| 14 | S14 | 95.0 | G1 | 4.2  | 0.8 | 900 | —   | —    | —    | insufficient sinterability |
| 15 | S15 | 95.0 | G1 | 4.2  | 0.8 | 900 | 79  | 3500 | −40  | |
| 16 | S16 | 95.0 | G1 | 4.2  | 0.8 | 900 | —   | —    | —    | insufficient sinterability |
| 17 | S17 | 95.0 | G1 | 4.2  | 0.8 | 900 | 91  | 3500 | −25  | |
| 18 | S18 | 95.0 | G1 | 4.2  | 0.8 | 900 | —   | —    | —    | insufficient sinterability |
| 19 | S19 | 95.0 | G1 | 4.2  | 0.8 | 900 | 88  | 3900 | 0    | |
| 20 | S20 | 95.0 | G1 | 4.2  | 0.8 | 900 | —   | —    | —    | insufficient sinterability |
| 21 | S3  | 95.0 | G2 | 4.2  | 0.8 | 900 | 92  | 3500 | −25  | |
| 22 | S3  | 92.0 | G3 | 7.2  | 0.8 | 900 | 80  | 2500 | −10  | |
| 23 | S3  | 98.7 | G1 | 0.5  | 0.8 | 900 | —   | —    | —    | insufficient sinterability |
| 24 | S3  | 98.0 | G1 | 1.2  | 0.8 | 900 | 98  | 2000 | 0    | |
| 25 | S3  | 80.0 | G1 | 19.2 | 0.8 | 900 | 55  | 1000 | +30  | |
| 26 | S3  | 69.2 | G1 | 30.0 | 0.8 | 900 | 45  | 500  | +60  | low εr |
| 27 | S2  | 95.8 | G1 | 4.2  | 0   | 900 | 87  | 3200 | −35  | |
| 28 | S3  | 93.8 | G1 | 4.2  | 2.0 | 900 | 100 | 1000 | +130 | |
| 29 | S3  | 92.8 | G1 | 4.2  | 3.0 | 900 | 115 | 200  | +200 | low Q-value |
| 30 | S1  | 95.8 | G1 | 4.2  | 0   | 900 | —   | —    | —    | insufficient sinterability |

The results of samples No. 1 to No. 6 demonstrate that the preferred proportion of the CuO powder to the powdery main material is about 0.1% to 2.0% by weight. To be more specific, when the proportion of the CuO powder to the powdery main material exceeded about 2.0% by weight as in sample No. 1, the Q-value of the resultant low-temperature firing ceramic composition was liable to be decreased. On the contrary, when it was less than about 0.1% by weight as in the sample No. 5, the sinterability was insufficient and the advantage involved in low-temperature firing was deteriorated. When no CuO powder was compounded as in the sample No. 6, the proportion of the glass component must exceed 10% by weight to give sufficient sinterability, resulting in a somewhat lowered specific dielectric constant εr.

The results of the samples Nos. 3 and 7 to 11 show that the calcination temperature of the powdery ceramic material mixture is preferably 950° C. or higher. When the calcination temperature was 900° C. as in the sample No. 7, the sinterability of the resultant low-temperature firing ceramic composition was liable to be decreased. To the contrary, even when the calcination temperature was lower than 1050° C. as in the samples Nos. 3, 8 and 9, low-temperature firing ceramic compositions having a high specific dielectric constant εr, Q-value and a low temperature coefficient of dielectric constant Tcc could be obtained.

It is demonstrated from the results of the samples Nos. 3, and 12 to 14 that the calcined powdery ceramic material mixture is preferably milled to a mean particle diameter of about 2.0 μm or less. When the powder was milled only to a mean particle diameter of 3.0 μm as in the sample No. 14, the sinterability was insufficient and low-temperature firing became difficult. More preferably, the calcined powdery ceramic material mixture is milled to a mean particle diameter of about 1.0 μm or less for higher temperature coefficient of dielectric constant Tcc.

The results of the samples Nos. 3 and Nos. 27 to 30 demonstrate that CuO is preferably added to the milled powdery ceramic material mixture in a proportion of about 2.0% by weight or less. If the proportion exceeded about 2.0% by weight as in the sample No. 29, the Q-value of the resultant low-temperature firing ceramic composition was liable to be decreased. When no CuO was compounded as in the sample No. 30, the sinterability was deteriorated.

As shown in the results of the samples Nos. 3, and Nos. 23 to 26, it is preferred that about 80.0% to 98.0% by weight of the milled powdery ceramic material mixture (ceramic component), and about 1.0% to 20.0% by weight an RO—$B_2O_3$—$SiO_2$ glass powder (glass component) are blended to make 100% by weight of the powdery glass-ceramic material mixture. When the proportion of the ceramic component exceeded about 98.0% by weight and the proportion of the glass component was less than about 1.0% by weight as in the sample No. 23, the sinterability was liable to become insufficient. When the proportion of the ceramic component was less than about 80.0% by weight and that of the glass component exceeded about 20.0% by weight as in the sample No. 26, the specific dielectric constant and Q-value were liable to be decreased.

The results of the samples Nos. 2 to 4, 8 to 10, 13, 15, 17, 19, 21, 22, 25, 27 and 28 demonstrate that the low-temperature firing ceramic composition is preferably prepared by the steps of: admixing about 0.1 to 2.0% by weight of CuO with a BaO—$TiO_2$—$ReO_{3/2}$—$Bi_2O_3$ main material to give a powdery ceramic material mixture, calcining the powdery ceramic material mixture at a temperature of 950° C. or higher, milling the calcined powder to a mean particle diameter of about 2.0 μm or less, admixing about 1.0% to 20.0% by weight of an RO—$B_2O_3$—$SiO_2$ glass component and about 2.0% by weight or less of the additional CuO with about 80.0% to 98.0% by weight of the obtained ceramic material powder to give a powdery glass-ceramic material mixture, and forming and firing the powdery glass-ceramic material mixture to give a low-temperature firing ceramic composition. The thus-obtained ceramic composition is sinterable at a temperature of 900° C. or lower, and can be calcined at a comparatively low temperature (especially at 950° C. to 1050° C.), and it can be produced at low cost with facility because temperatures required for the calcination and sintering can be lowered. This is also a dielectric ceramic composition satisfactory in specific dielectric constant $\epsilon r$, Q-value, temperature coefficient of dielectric constant Tcc, and other electric characteristics and thermal characteristics.

The results demonstrate, as thus described, that the sintering temperature of the resultant low-temperature firing ceramic compositions could be lowered to 900° C. or lower by adding a $B_2O_3$—$SiO_2$ glass component to a BaO—$TiO_2$—$ReO_{3/2}$—$Bi_2O_3$ ceramic component and further adding CuO to the mixture. In addition, the low-temperature firing ceramic compositions had a high specific dielectric constant $\epsilon r$, a high Q-value and a satisfactory temperature coefficient of dielectric constant Tcc.

In other words, low-temperature firing can be achieved by admixing CuO with a BaO—$TiO_2$—$ReO_{3/2}$—$Bi_2O_3$ ceramic composition, a main component, in the preparation of a calcination material of a dielectric ceramic composition, calcining the resultant mixture at a temperature of 950° C. or higher, and milling the calcined material mixture powder to a mean particle diameter of about 2 $\mu$m or less, preferably of about 1 $\mu$m or less. Furthermore, the addition of small portions of a glass material predominantly containing an RO—$B_2O_3$—$SiO_2$ and another portion of CuO as sintering aids to the milled material provides firing at low temperatures of 1000° C. or lower, preferably 900° C. or lower, while maintaining the high specific dielectric constant $\epsilon r$ and Q-value of the dielectric ceramic composition.

Similar advantages as above can also be obtained by mixing CuO to a glass component in the ratios shown in Table 3 to prepare a glass powder and adding the resultant glass powder to a material mixture powder in the proportions indicated in Table 3.

As thus described, the process for the production of dielectric porcelain compositions, where a main crystalline phase is precipitated at comparatively low temperatures, can yield low-temperature firing ceramic compositions which are sinterable at low temperatures and have a high specific dielectric constant and Q-value and a satisfactory thermostability.

This is because when CuO is added to a $BaCO_3$—$TiO_2$—$ReO_{3/2}$—$Bi_2O_3$ main material and the resultant mixture is calcined, CuO forms a liquid phase during the calcination and promotes the reaction of the material for porcelain compositions and thereby promotes the formation of a main crystalline phase of, for instance, $Ba(Nd,Bi)_2Ti_4O_{12}$. Furthermore, CuO anchors to the surface of the main crystalline phase particle after the calcination thereby to increase the sinterability of the main crystalline phase particle. In addition, the milling of the main crystalline phase particle increases its specific surface area to improve the sinterability further more.

Other embodiments and variations will be obvious to those skilled in the art, and this invention is not to be limited to the specific matters stated above.

What is claimed is:

1. A process for the production of a low-temperature firing ceramic composition, said process comprising:

a first step of admixing CuO with a BaO—$TiO_2$—$ReO_{3/2}$—$Bi_2O_3$ main material, wherein Re is a lanthanoid element, to give a ceramic material mixture, a second step of calcining said ceramic material mixture, wherein the calcination in the second step is conducted at a temperature equal or to a higher than 950° C. and equal to or lower than 1050° C., a third step of milling said calcined ceramic material mixture, a fourth step of admixing a $B_2O_3$—$SiO_2$ glass with said milled ceramic material mixture to give a glass-ceramic material mixture, and a fifth step of firing the glass-ceramic material mixture.

2. A process according to claim 1, wherein said glass-ceramic material mixture is shaped prior to firing in the fifth step.

3. A process according to claim 2, wherein said CuO is added in a proportion of about 0.1% to 2.0% by weight relative to 100% by weight of said main material in the first step.

4. A process according to claim 1, wherein said calcined ceramic material mixture is milled to a mean particle diameter of about 2.0 $\mu$m or less in the third step.

5. A process according to claim 4, wherein said calcined ceramic material is milled to a mean particle diameter of about 0.1 $\mu$m or more.

6. A process according to claim 4, wherein additional CuO is admixed with said milled ceramic material mixture in the fourth step.

7. A process according to claim 6, wherein about 80.0% to 98.0% by weight of said milled ceramic material mixture, about 1.0% to 20.0% by weight of an RO—$B_2O_3$—$SiO_2$ glass material as said glass component, wherein R is an alkaline earth metal element, and about 2.0% by weight or less of CuO are admixed in the fourth step to make 100% by weight said glass-ceramic material mixture.

8. A process according to claim 7, further comprising the step of positioning at least one electrode in the interior of a body comprising the fired glass-ceramic material mixture.

9. A process according to claim 1, wherein said CuO is added in a proportion of about 0.1% to 2.0% by weight relative to 100% by weight of said main material in the first step.

10. A process according to claim 1, wherein said calcined ceramic material mixture is milled to a mean particle diameter of about 2.0 $\mu$m or less in the third step.

11. A process according to claim 1, wherein said calcined ceramic material is milled to a mean particle diameter of about 0.1 $\mu$m or more.

12. A process according to claim 1, wherein additional CuO is admixed with said milled ceramic material mixture in the fourth step.

13. A process according to claim 1, wherein about 80.0% to 98.0% by weight of said milled ceramic material mixture, about 1.0% to 20.0% by weight of an RO—$B_2O_3$—$SiO_2$ glass material as said glass component, wherein R is an alkaline earth metal element, and about 2.0% by weight or less of CuO are admixed in the fourth step to make 100% by weight said glass-ceramic material mixture.

14. A process according to claim 1, further comprising the step of positioning at least one electrode in the interior of a body comprising the fired glass-ceramic material mixture.

15. A process according to claim 1 in which the ceramic material mixture is lead free.

16. A process according to claim 15 in which said $B_2O_3$—$SiO_2$ is lead free.

17. A process according to claim 1 in which said $B_2O_3$—$SiO_2$ is lead free.

* * * * *